US012774778B2

(12) United States Patent
Zhang

(10) Patent No.: US 12,774,778 B2
(45) Date of Patent: Oct. 27, 2026

(54) SUPPORT LEG STAND WITH SUPPORT LEGS CAPABLE OF FULLY BOUNCING OFF

(71) Applicant: Shenzhen Liangdianpai Technology Co., Ltd., Shenzhen (CN)

(72) Inventor: Ming Zhang, Shenzhen (CN)

(73) Assignee: SHENZHEN LIANGDIANPAI TECHNOLOGY CO., LTD., Shenzhen (CN)

(*) Notice: Subject to any disclaimer, the term of this patent is extended or adjusted under 35 U.S.C. 154(b) by 100 days.

(21) Appl. No.: 19/024,167

(22) Filed: Jan. 16, 2025

(65) Prior Publication Data

US 2026/0132884 A1 May 14, 2026

(30) Foreign Application Priority Data

Nov. 12, 2024 (CN) ........................ 202422750620.9

(51) Int. Cl.
*F16M 11/24* (2006.01)

(52) U.S. Cl.
CPC ................................ *F16M 11/245* (2013.01)

(58) Field of Classification Search
CPC .... F16M 11/245; F16M 11/041; F16M 11/28; F16M 13/00; F16M 2200/02
See application file for complete search history.

(56) References Cited

U.S. PATENT DOCUMENTS

| | | | | |
|---|---|---|---|---|
| 4,121,799 A * | 10/1978 | Michio | F16M 11/38 | 248/188.7 |
| 5,421,549 A * | 6/1995 | Richards | F16M 11/10 | 396/419 |
| 8,939,602 B2 * | 1/2015 | Wessel | F21L 4/045 | 362/208 |
| 11,835,208 B1 * | 12/2023 | Chen | F16M 11/245 | |
| 11,940,717 B1 * | 3/2024 | Zou | G03B 17/56 | |
| 12,104,742 B1 * | 10/2024 | Hu | F16M 11/041 | |
| 2016/0161050 A1 * | 6/2016 | Trebesius | F16M 11/38 | 248/122.1 |

FOREIGN PATENT DOCUMENTS

CN 210424351 U 4/2020

* cited by examiner

*Primary Examiner* — Anita M King
(74) *Attorney, Agent, or Firm* — Yuhao Liang

(57) ABSTRACT

A support leg stand with support legs capable of fully bouncing off is provided. Compared with the prior art, one end of a reinforcing rib in the present disclosure is rotatably connected to a support leg and the other end thereof is rotatably connected to a center column/locking assembly. In addition, a first elastic member is arranged between the reinforcing rib and the support leg. When a free end of the support leg is adapted to fit with the locking assembly, the first elastic member undergoes elastic deformation and generates a restoring force; when the locking assembly releases constraint, the free end of the support leg moves away from the center column under action of the restoring force and the support legs fully unfold. The ingenious design with the first elastic member allows the whole tripod to be completely bounced off, which is more convenient to use.

20 Claims, 12 Drawing Sheets

SUPPORT LEG STAND WITH SUPPORT LEGS CAPABLE OF FULLY BOUNCING OFF

RELATED APPLICATIONS

The present application claims the benefit of priority of Chinese Patent Application No. 202422750620.9, filed Nov. 12, 2024, and entitled "SUPPORT LEG STAND WITH SUPPORT LEGS CAPABLE OF FULLY BOUNCING OFF," the entire content of which is incorporated herein by reference.

TECHNICAL FIELD

The present disclosure relates to the field of supporting equipment, in particular to a support leg stand with support legs capable of fully bouncing off.

BACKGROUND ART

The supporting device is often used to hold equipment such as projectors, mobile phones and cameras. Tripod is a common support structure. In order to realize convenient storage, the tripod is often designed as a structure that can be folded and unfolded. For example, a previous application with a patent number of CN201921123317.9 discloses a support stand; when not in use, support legs can be folded to a center column for easy carrying; when it needs to be used, pressing an elastic clamping mechanism can slightly unfold the support legs from a position where they fit with the center column. However, this kind of unfolding only changes the support legs into an unfoldable state, and the unfolding range is very limited. It is still necessary to manually rotate the support legs to fully unfold them.

Therefore, it can be further optimized to solve the problem that the support legs need to be rotated manually for fully unfolding them.

SUMMARY OF THE INVENTION

The main purpose of the present disclosure is to provide a support leg stand with support legs capable of fully bouncing off. Multiple support legs can be unlocked at the same time when being stimulated by an external force, and the multiple support legs are fully unfolded without manually rotating them, and the unfolding is faster and more convenient.

In order to achieve the above-mentioned purpose, the present disclosure provides a support leg stand with support legs capable of fully bouncing off, comprising a center column, the center column being provided with a connecting seat; the support leg stand further comprises unfoldable/foldable support legs, a locking assembly, and reinforcing ribs.

One end of the support leg is rotatably connected with the connecting seat, and the other end thereof is a free end; when the free end of the support leg is close to the center column, the support leg is folded, and when the free end of the support leg is away from the center column, the support leg is unfolded.

The locking assembly is adapted to fit with the free end of the support leg when the support leg is folded, so as to limit the movement of the support leg relative to the center column, and the locking assembly will release constraint after being triggered.

One end of the reinforcing rib is rotatably connected with the support leg, and the other end thereof is rotatably connected with the center column/locking assembly; in addition, a first elastic member is arranged between the reinforcing rib and the support leg; when a free end of the support leg is adapted to fit with the locking assembly, the first elastic member undergoes elastic deformation and generates a restoring force; when the locking assembly releases constraint, the free end of the support leg moves away from the center column under action of the restoring force of the first elastic member and the support legs fully unfold.

In a specific solution, the reinforcing rib is provided with a first rotation axis, the first rotation axis is rotatably connected with the support leg; and the first elastic member is a torsion spring sleeved on the first rotation axis.

When the free end of the support leg is adapted to fit with the locking assembly, the torsion spring is twisted and generates a torsional force; when the locking assembly releases constraint, the torsion force provided by the torsion spring drives the free end of the support leg away from the center column and the support legs then fully unfold.

In a specific solution, at least two first grooves are formed on the support leg, and both ends of the first rotation axis are respectively inserted into the first grooves to form a structure in which the first rotation axis rotates in the first groove.

In a specific solution, the support leg is further provided with a stop block, the stop block is arranged at an opening of the first groove and configured to prevent the first rotation axis from sliding out of the first groove.

In another easily conceivable alternative, a stop block is arranged on the support leg, at least two first grooves are formed on the stop block, and both ends of the first rotation axis are respectively inserted into the first grooves to form a structure in which the first rotation axis rotates in the first groove.

In a specific solution, the torsion spring comprises a main body and a first and a second force arms extending from the main body, the main body is sleeved on the first rotation axis, the first force arm abuts against the support leg, and the second force arm abuts against the reinforcing rib.

In a specific solution, a first through hole is formed on the support leg, the first force arm passes through or abuts against the first through hole, a second through hole is formed on the reinforcing rib, and the second force arm passes through or abuts against the second through hole.

In another easily conceivable alternative, a stop block is arranged on the support leg, a first through hole is formed on the stop block, the first force arm passes through or abuts against the first through hole, a second through hole is formed on the reinforcing rib, and the second force arm passes through or abuts against the second through hole.

In a preferred solution, the reinforcing ribs are arranged in one-to-one correspondence with the support legs.

In a specific solution, the locking assembly comprises a fixing seat, a trigger button and a second elastic member, the fixing seat is connected with the center column, and the second elastic member is arranged between the trigger button and the fixing seat.

In addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

In a specific solution, the fixing seat is provided with a second groove, one end of the second elastic member is accommodated in the second groove and abuts against a bottom of the second groove, and the other end of the second elastic member is sleeved on the trigger button.

In a preferred solution, an extrusion block is arranged on a side of one end of the trigger button not sleeved with the second elastic member, and when the trigger button is stimulated, the clamping structure releases constraint on the support legs; at the same time, the extrusion block moves along with the trigger button to extrude the support legs so that the support legs move in an unfolding direction.

In a specific solution, one end of the trigger button sleeved with the second elastic member is provided with an extension portion, the extension portion surrounds an axial direction of the trigger button, and the clamping structure is arranged on the extension portion; when the trigger button compresses the second elastic member, it drives the clamping structure to move in a direction of compressing the second elastic member.

The clamping structure is a first bulge, and the support leg is provided with a second bulge, the first bulge and the second bulge abut against each other to limit the movement of the support legs relative to the center column; stimulating the trigger button, the first bulge moves and separates from the second bulge to release constraint on the support legs.

Further a limit cover is provided, the limit cover is arranged above the second groove and forms an accommodating space with the second groove, and the elastic member is located in the accommodating space; and the limit cover is provided with multiple openings, one end of the trigger button not sleeved with the elastic member and the first bulge pass through the opening.

In a specific solution, a top of one end of the trigger button not sleeved with the elastic member is provided with a pressing cap.

The present disclosure has the following beneficial effects.

Compared with the prior art, one end of a reinforcing rib in the present disclosure is rotatably connected to a support leg and the other end thereof is rotatably connected to a center column/locking assembly. In addition, a first elastic member is arranged between the reinforcing rib and the support leg. When a free end of the support leg is adapted to fit with the locking assembly, the first elastic member undergoes elastic deformation and generates a restoring force; when the locking assembly releases constraint, the free end of the support leg moves away from the center column under action of the restoring force and the support legs fully unfold. The ingenious design of the first elastic member solves the problem that after the locking assembly releases constraint, the support legs are only slightly unfolded and still need to be rotated manually to be unfolded fully. After the locking assembly of the present disclosure releases constraint, the whole tripod can be completely bounced off, which is more convenient to use.

BRIEF DESCRIPTION OF THE DRAWINGS

To illustrate technical solutions in embodiments of the present disclosure or the prior art more clearly, accompanying drawings to be used for describing the embodiments or prior art are introduced briefly in the following. Apparently, the accompanying drawings in the following description are only some embodiments of the present disclosure, and persons of ordinary skill in the art can obtain other drawings according to the structures shown in these drawings without making creative efforts.

Figure 1:
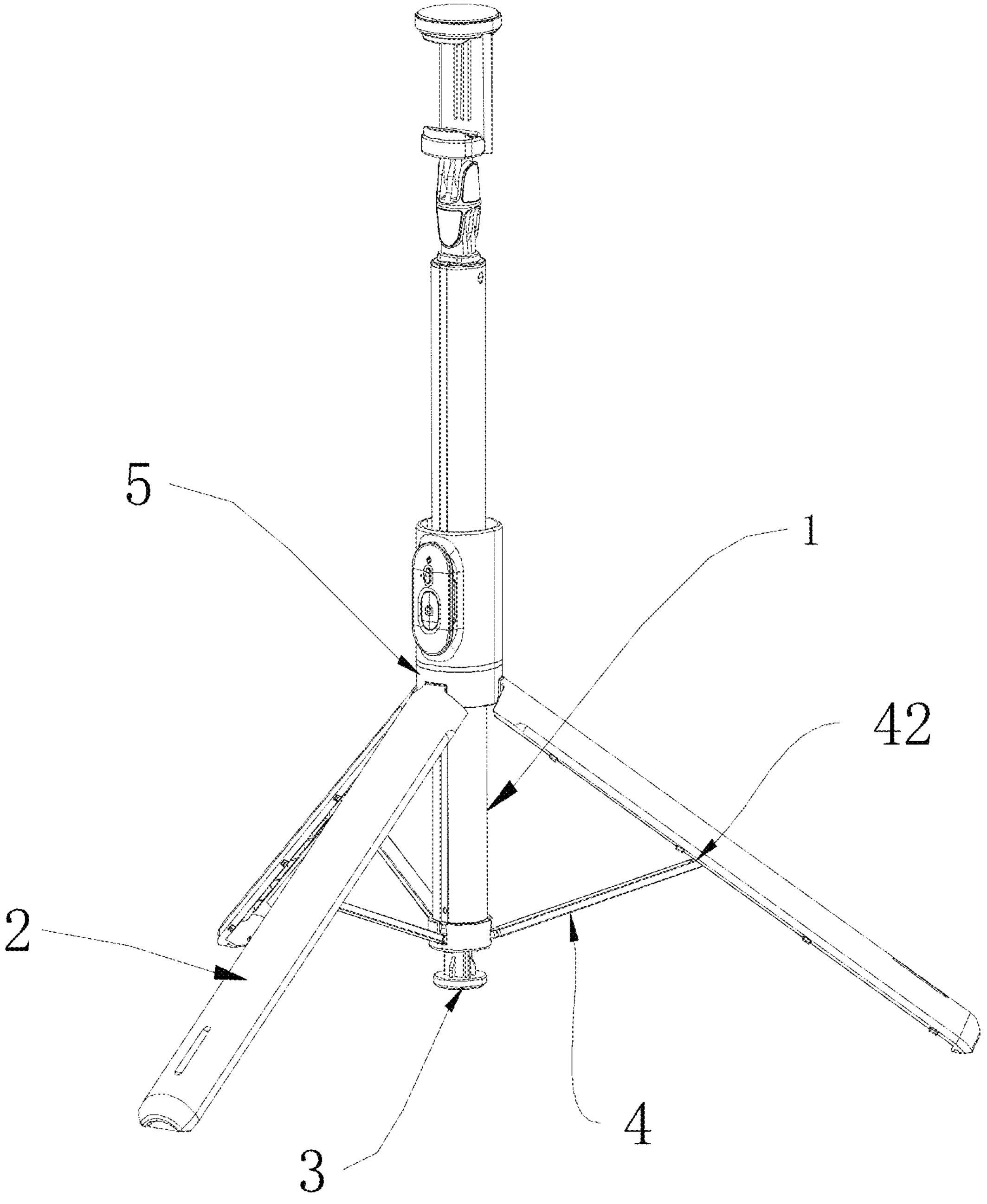
FIG. 1 is a structural view of a support leg stand fully unfolded according to the present disclosure.

Reference numerals are listed below: 1. center column; 2. support leg; 21. second bulge; 22. extrusion point; 3. locking assembly; 31. trigger button; 32. fixing seat; 33. limit cover; 34. second elastic member; 311. extrusion block, 312. first bulge, 313 extension portion; 4. reinforcing rib; 41. first rotation axis; 42. first elastic member; 43. stop block; 44. first groove; 420. main body; 421. second force arm; 422. first force arm; 431. first through hole; 5. connecting seat.

The purpose realization, functional characteristics and advantages of the present disclosure will be further described with reference to embodiments and drawings.

DETAILED DESCRIPTION OF EMBODIMENTS

The following description provides a clear and complete description for the technical solutions in the embodiments of the present disclosure along with the drawings in the embodiments. Obviously, the embodiments are only some of rather than all of the embodiments of the present disclosure. Any other embodiments acquired by persons of ordinary skills in the art without creative efforts but based on the embodiments of the present disclosure are covered by the range of protection by the present disclosure.

It should be noted that if the embodiments of the present disclosure involve directional indications (such as up, down, left, right, forward, back . . . ), such directional indications are only used to explain the relative positional relationship, movement, etc., between the components in a particular attitude (as shown in the attached drawings), and if the particular attitude is changed, the directional indication will be changed accordingly.

Furthermore, if the embodiments of the present disclosure contain descriptions involving "first", "second", etc., the descriptions of "first", "second", etc. are used only for descriptive purposes and are not to be construed as indicating or implying their relative importance or implicitly specifying the number of technical features indicated. Thus, the features defined with the terms "first" and "second" may explicitly or implicitly comprise at least one of these features. Furthermore, the technical solutions between embodiments may be combined with each other, but it must be based on the fact that the person of ordinary skill in the art is able to realize it, and when the combination of the technical solutions appears to be contradictory or unattainable it should be considered that the combination of such technical solutions does not exist, and is not in the scope of protection claimed in the present disclosure.

Figure 2:
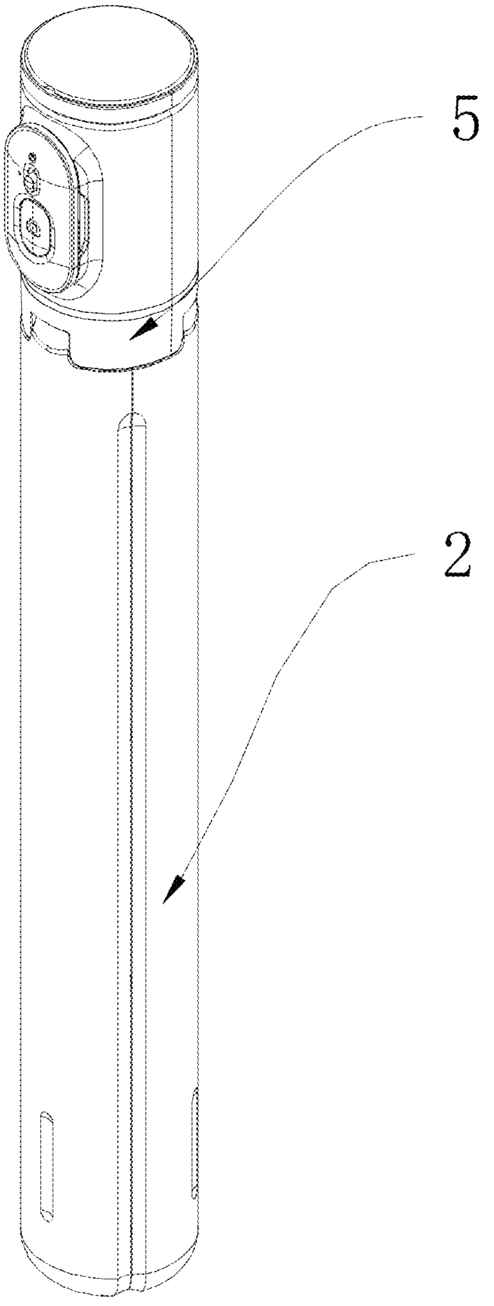
FIG. 2 is a structural view of a support leg stand folded according to the present disclosure.

Referring to FIGS. 1 and 2, the existing support stand generally comprises a center column 1 and support legs 2 for supporting the center column 1. One end of the support leg 2 is rotatably connected with the center column 1 or the connecting seat sleeved on the center column 1, and the other end thereof is a free end. When the free ends of the support legs 2 are fully unfolded, the support legs 2 are configured to support the center column 1, and the center column 1 can be connected with shooting equipment, mobile phones, fill lights, etc. Therefore, the support legs 2 are common in live streaming and shooting scenes. After use, the free ends of the support legs 2 can be folded to the center column 1 for easy carrying. As described in the background art, when the existing support stand needs to be used, it is possible to directly press an elastic clamping mechanism and unlock the support legs 2. However, in this unlocked state, the support legs 2 will not automatically unfold, they only slightly unfold from a position where it fits with the center column 1. It is still necessary to manually rotate the support legs 2 so that the support legs 2 can be fully unfolded and the center column 1 can be stably supported.

Figure 3:
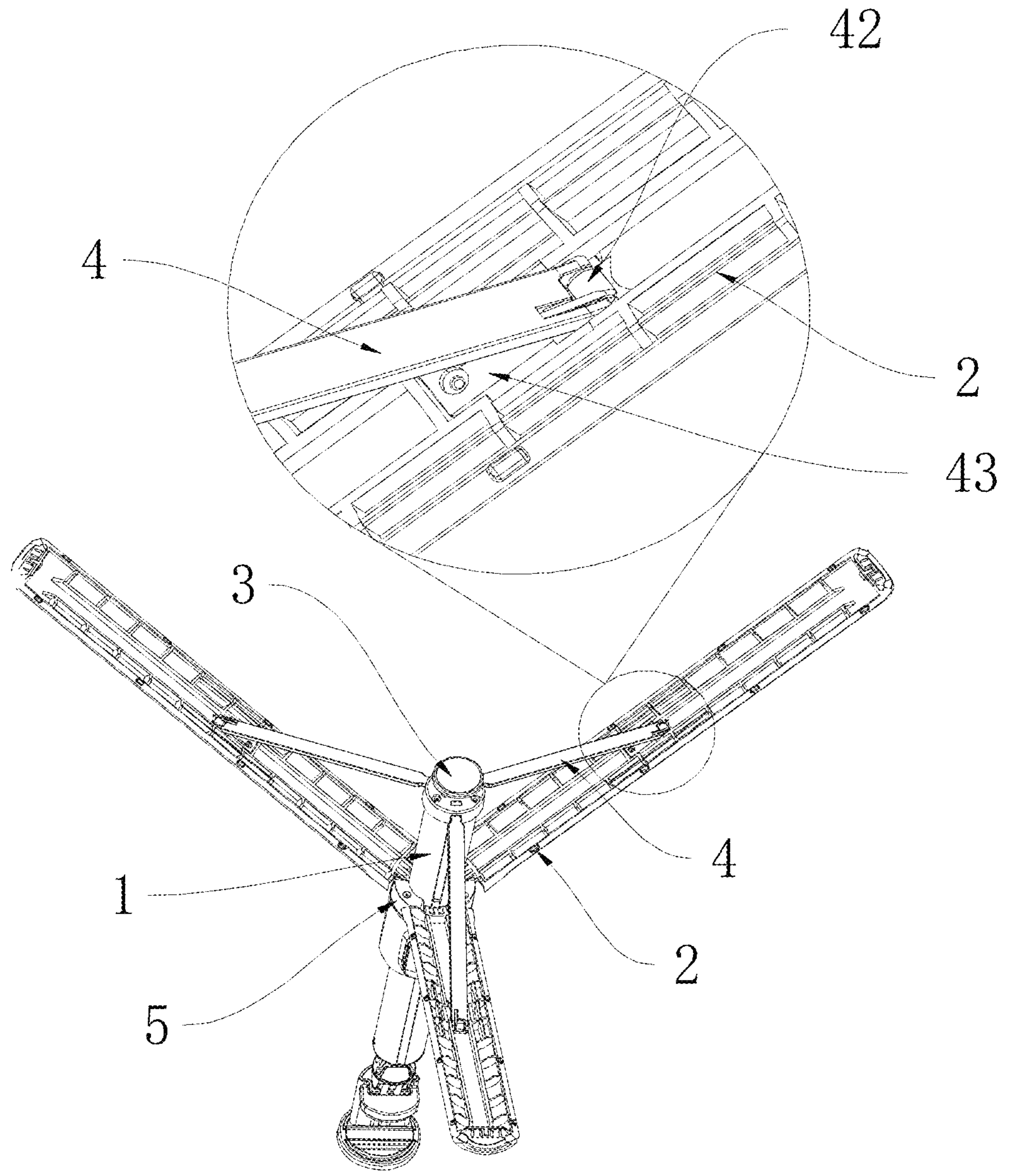
FIG. 3 is a structural view of the positional relationship between a first elastic member and a reinforcing rib according to the present disclosure.

In order to solve the above-mentioned problems, the present disclosure provides a support leg stand with support legs capable of fully bouncing off, as shown in FIG. 3, comprising: a center column 1, unfoldable/foldable support legs 2, a locking assembly 3, and reinforcing ribs 4.

The center column 1 is provided with a connecting seat 5.

One end of the support leg 2 is rotatably connected with the connecting seat 5, and the other end thereof is a free end; when the free end of the support leg 2 is close to the center column 1, the support leg 2 is folded, and when the free end of the support leg 2 is away from the center column 1, the support leg 2 is unfolded.

The locking assembly 3 is adapted to fit with the free end of the support leg 2 when the support leg 2 is folded, so as to limit the movement of the support leg 2 relative to the center column 1, and the locking assembly 3 will release constraint after being triggered.

One end of the reinforcing rib 4 is rotatably connected with the support leg 2, and the other end thereof is rotatably connected with the center column 1 or locking assembly 3; in addition, a first elastic member 42 is arranged between the reinforcing rib 4 and the support leg 2; when a free end of the support leg 2 is adapted to fit with the locking assembly 3, the first elastic member 42 undergoes elastic deformation and generates a restoring force; when the locking assembly 3 releases constraint, the free end of the support leg 2 moves away from the center column 1 under action of the restoring force of the first elastic member 42 and the support legs fully unfold.

In this embodiment, the tripod fully unfolding refers to that the support legs 2 are unfolded to a state where they can support or stably support the center column 1; generally speaking, when a tripod is fully unfolded, the support legs 2 need to rotate at a relatively large angle. However, in the prior art, the elastic clamping mechanism only releases the support legs 2, and the support legs 2 cannot be automatically unfolded, let alone automatically and completely unfolded.

In this embodiment, the locking assembly 3 can be triggered by pressing or rotating or impacting.

Compared with the prior art, one end of a reinforcing rib 4 in the present disclosure is rotatably connected to a support leg 2 and the other end thereof is rotatably connected to a center column 1 or locking assembly 3. In addition, a first elastic member 42 is arranged between the reinforcing rib 4 and the support leg 2.

When a free end of the support leg 2 is adapted to fit with the locking assembly 3, the first elastic member 42 undergoes elastic deformation and generates a restoring force; when the locking assembly 3 releases constraint, the free end of the support leg 2 moves away from the center column 1 under action of the restoring force and the support legs fully unfold. The ingenious design with the first elastic member 42 solves the problem that after the locking assembly 3 releases constraint, the support legs 2 are only slightly unfolded and still need to be rotated manually to be unfolded fully. After the locking assembly 3 of the present disclosure releases constraint, the support stand can be completely unfolded, which is more convenient to use.

In this embodiment, the number of support legs 2 in the support leg stand is 3, but it should not be understood as being limited thereto and may also be 4, 5 or other numbers.

Figure 4:
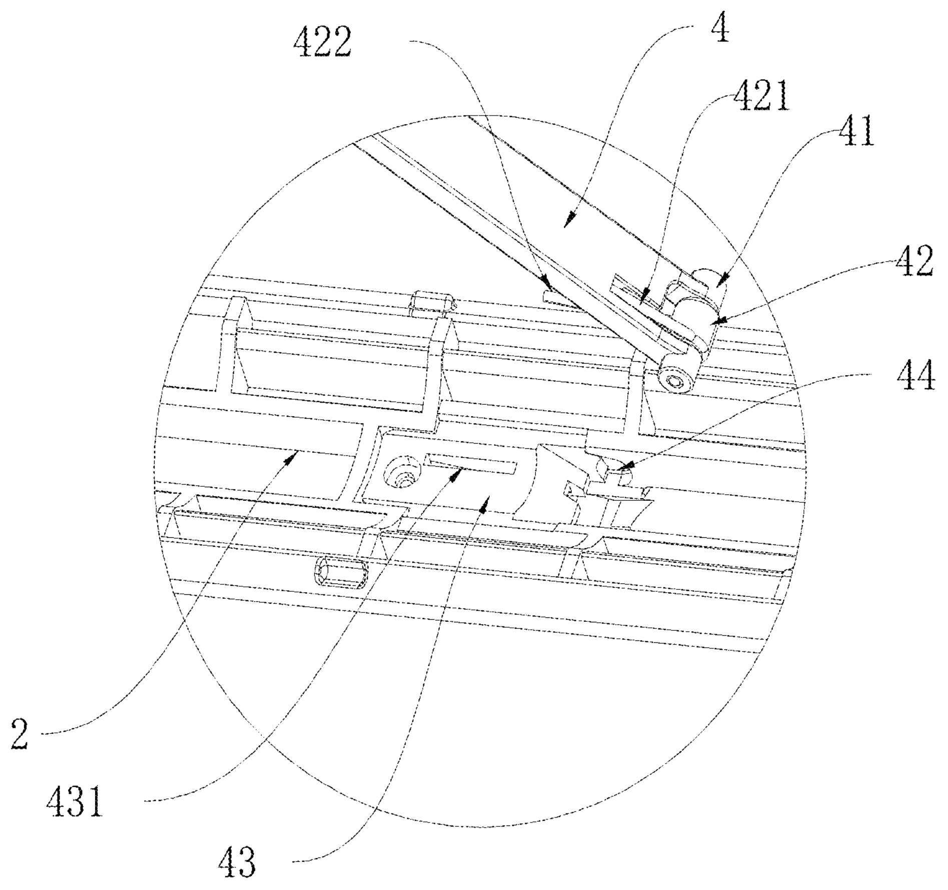
FIG. 4 is an exploded view of the connecting structure between a reinforcing rib and a support leg according to the present disclosure.
Figure 5:
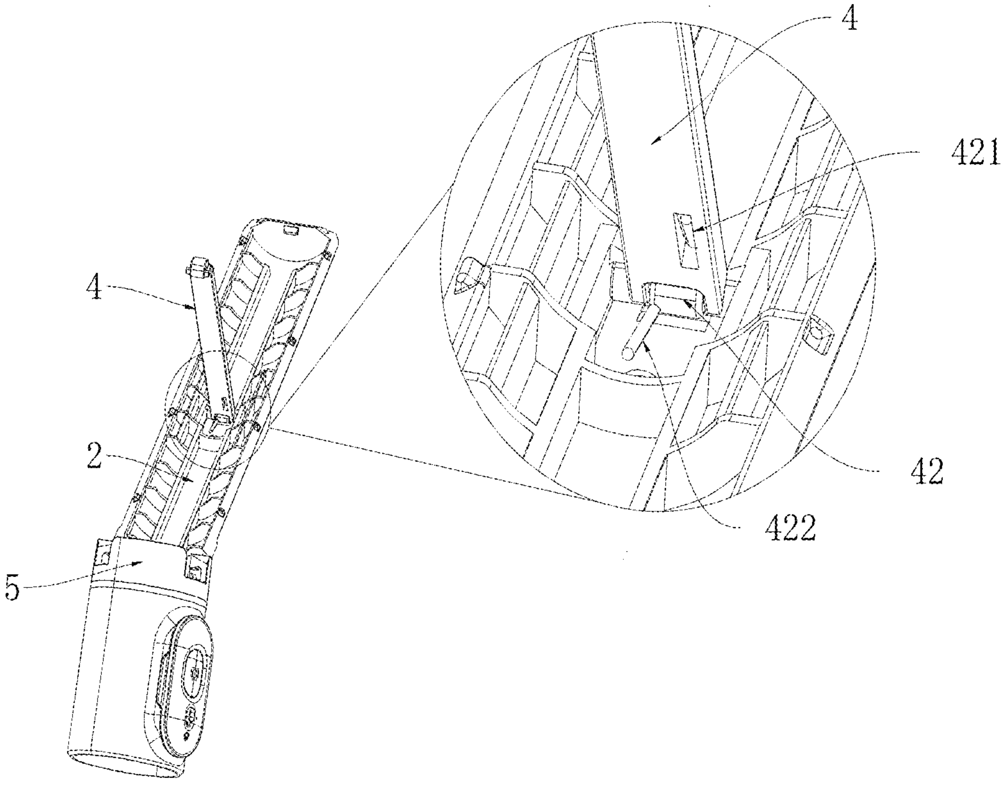
FIG. 5 is a structural view illustrating the connection between a reinforcing rib and a first elastic member according to the present disclosure.
Figure 6:
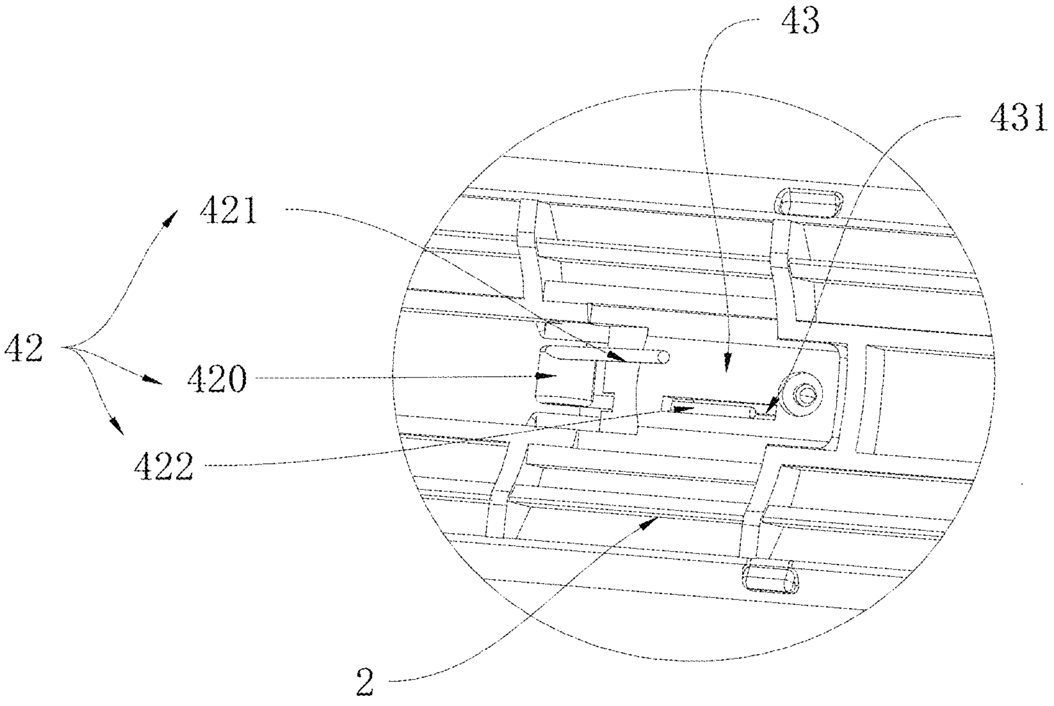
FIG. 6 is a structural view illustrating the connection between the stop block and the first elastic member according to the present disclosure.
Figure 7:
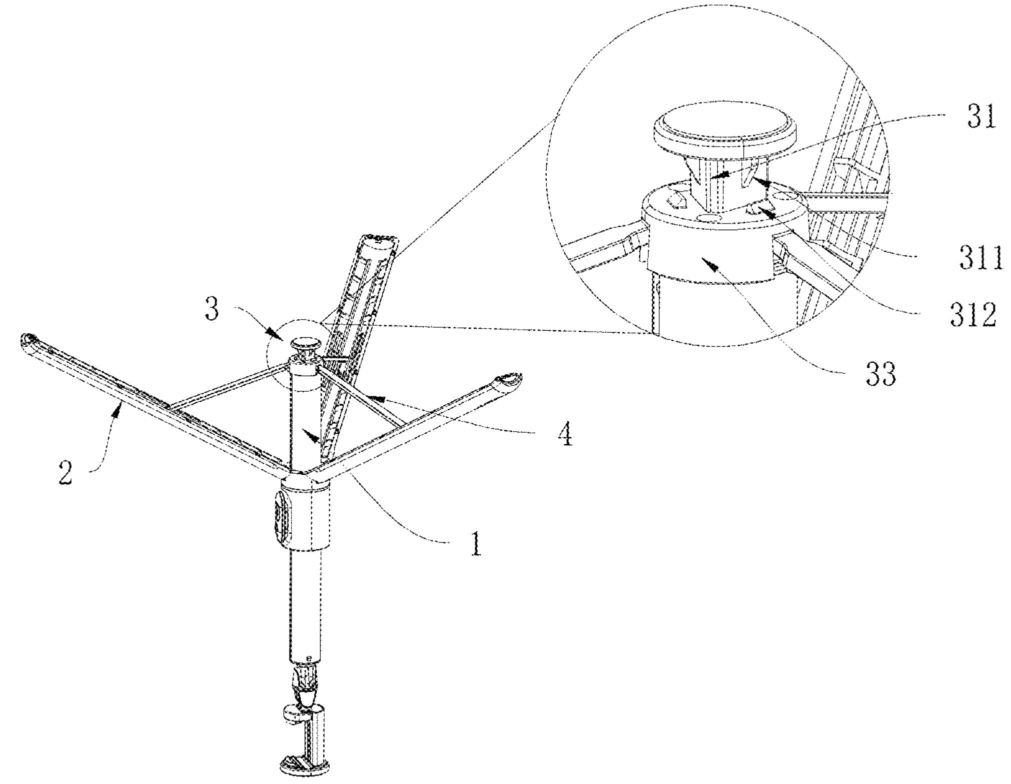
FIG. 7 is a structural view of a locking assembly in an unfolded state of the support legs according to the present disclosure.
Figure 8:
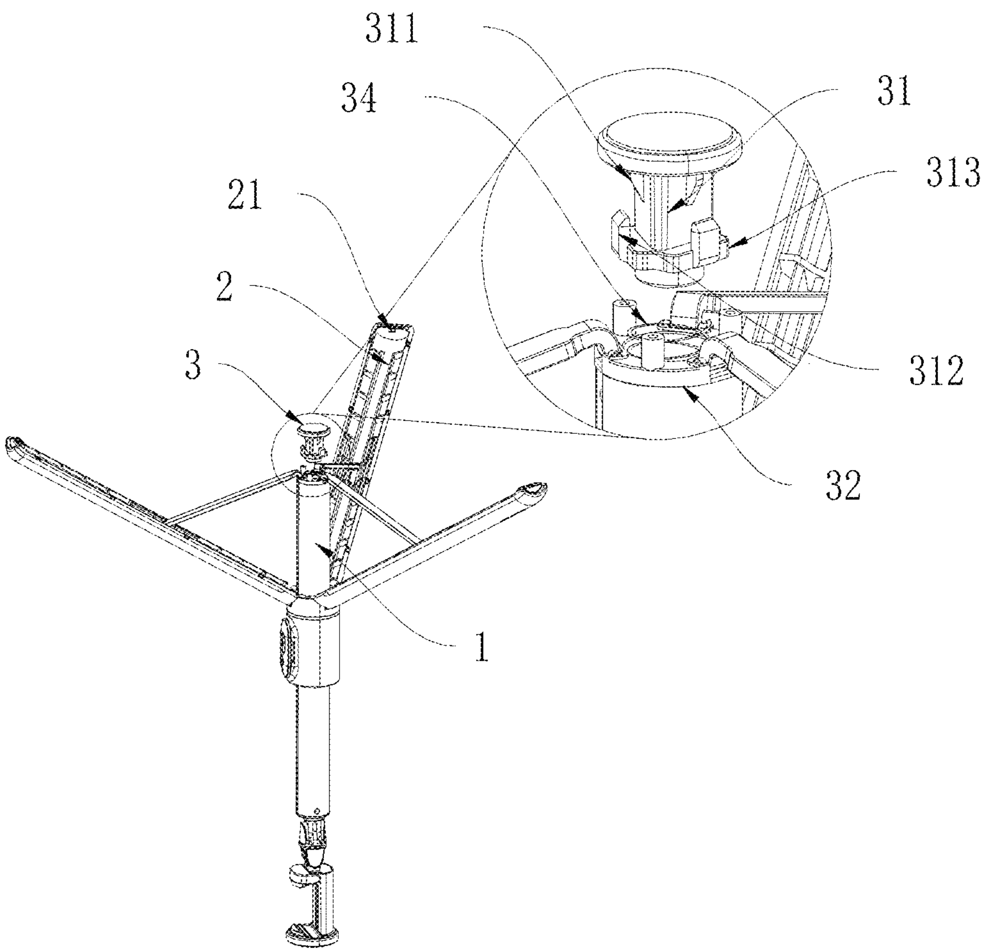
FIG. 8 is an exploded structural view of a locking assembly in an unfolded state of the support legs according to the present disclosure.
Figure 9:
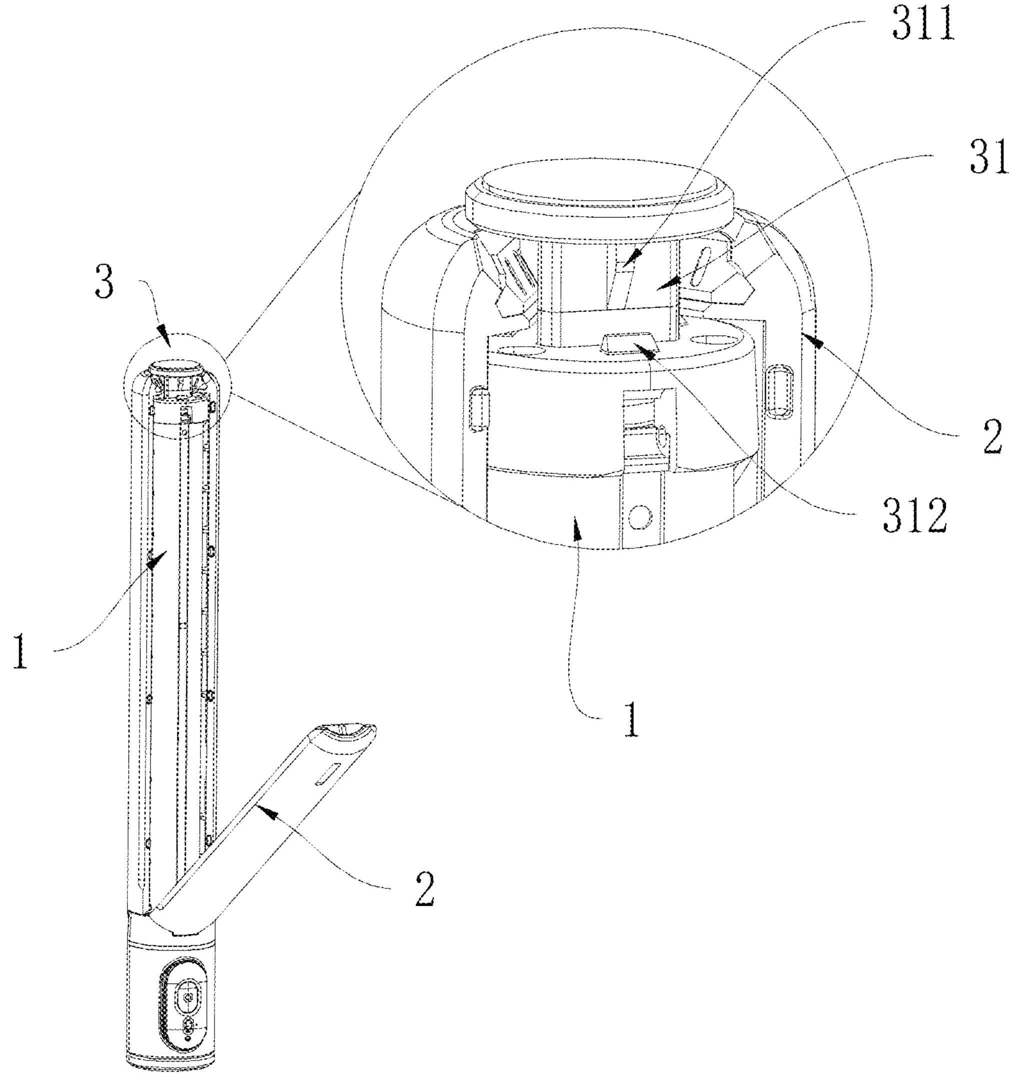
FIG. 9 is a structural view of a locking assembly when some support legs are folded according to the present disclosure.
Figure 10:
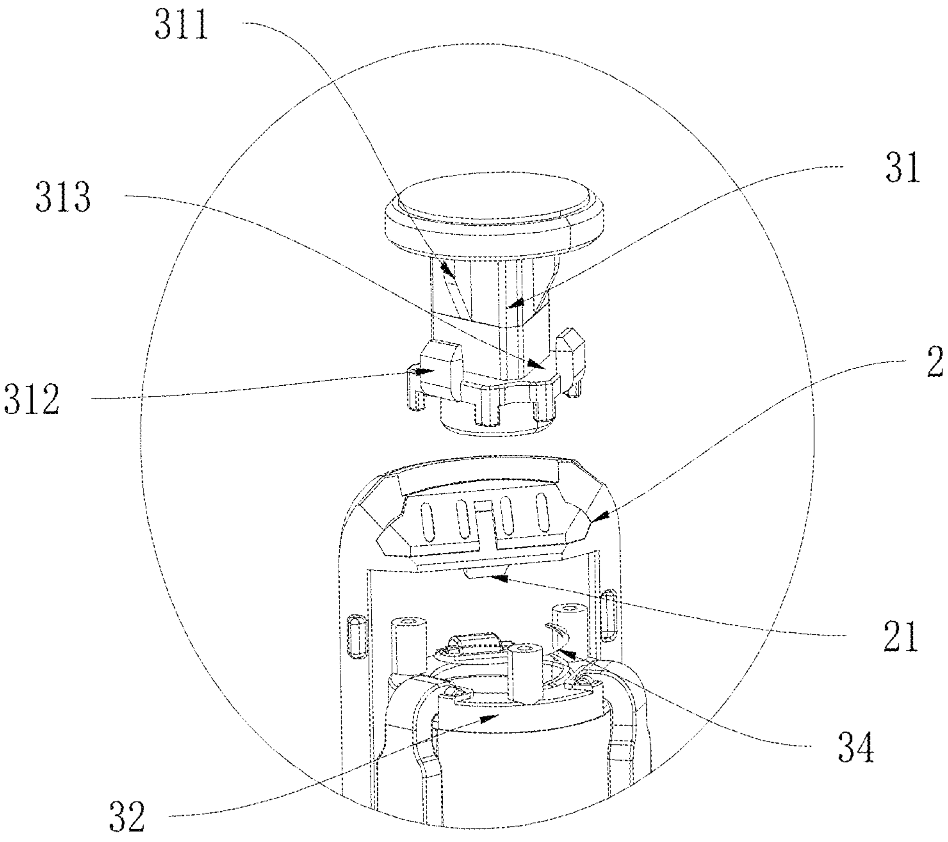
FIG. 10 is an exploded structural view of a locking assembly when some support legs are folded according to the present disclosure.
Figure 11:
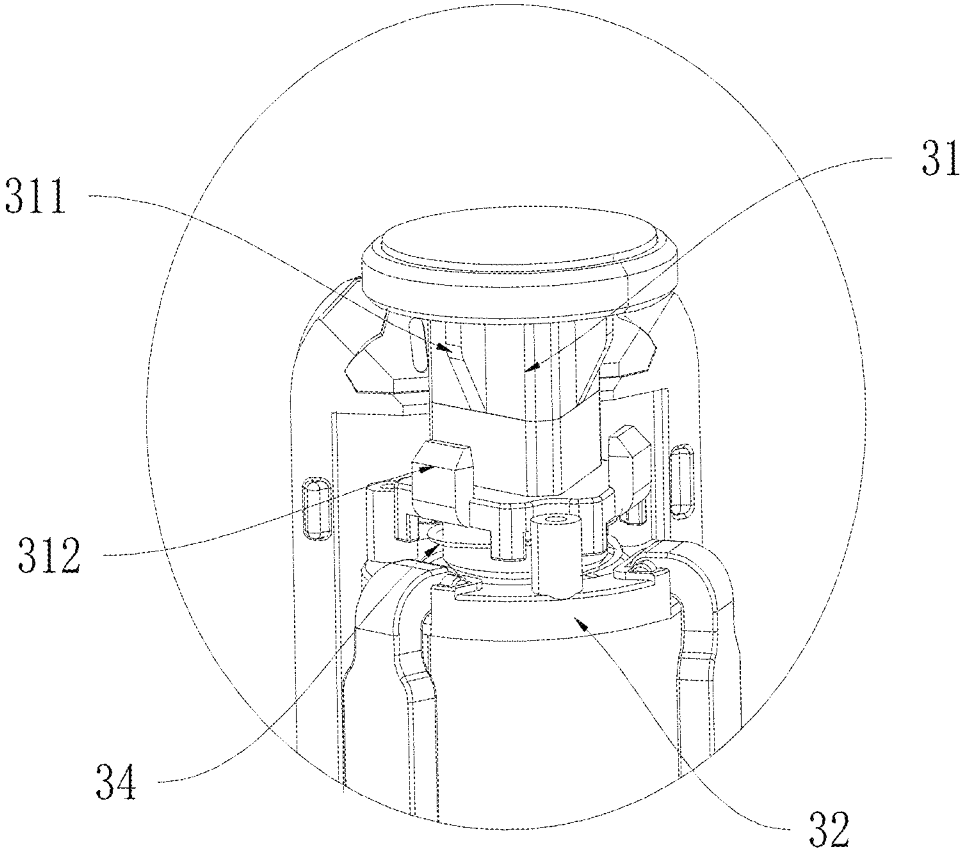
FIG. 11 is a structural view from another angle of view of a locking assembly when support legs are folded according to the present disclosure.

Referring to FIGS. 4-6, the reinforcing rib 4 is provided with a first rotation axis 41, and the first rotation axis 41 is rotatably connected with the support leg 2; the first elastic member 42 is a torsion spring, which is sleeved on the first rotation axis 41; when the free end of the support leg 2 is adapted to fit with the locking assembly 3, the torsion spring is twisted and generates a torsional force; when the locking assembly 3 releases constraint, the torsional force provided by the torsion spring drives the free end of the support leg 2 move away from the center column 1 and the support legs fully unfold.

In addition, it should be noted that the first rotation axis 41 and the reinforcing rib 4 may be of an integrated structure. The first rotation axis 41 is rotatably connected with the support leg 2, that is, the reinforcing rib 4 can be rotatably connected relative to the support leg 2.

Further, in this embodiment, at least two first grooves 44 are formed on the support leg 2, and both ends of the first rotation axis 41 are respectively inserted into the first grooves 44 to form a structure in which the first rotation axis 41 rotates in the first groove 44; both ends of the first rotation axis 41 protrude from the reinforcing rib 4, and the protruding parts at both ends can be respectively inserted into the first grooves 44.

It is easy to think of an equivalent solution that other removable additional structures are arranged on the support leg 2, and the first groove 44 is arranged on the removable additional structure. This kind of solution shall be regarded as equivalent to directly arranging the first groove 44 on the support leg. For example, a stop block 43 is arranged on the support leg, and the first groove 44 is arranged on the stop block 43.

In a preferred solution, the support leg 2 is further provided with a stop block 43, the stop block 43 is arranged at an opening of the first groove 44 and configured to prevent the first rotation axis 41 from sliding out of the first groove 44; the first groove 44 is a slot on the support leg 2, and the stop block 43 can be removed relative to the support leg 2; in this way, when installing the first rotation axis 41 in the production process, the first rotation axis 41 may be clamped into an opening of the first groove 44 first, and then the stop block 43 is connected with the support leg 2 so as to seal the opening of the first groove 44 and prevent the first rotation axis 41 from sliding out of the first groove 44, allowing production and processing being more convenient. In addition, in this embodiment, the cross section of the first groove 44 is a U-shaped structure. During installation, the first rotation axis 41 is clamped into the first groove 44 from the U-shaped opening, and the stop block 43 is disposed at the opening of the U-shaped structure.

In a preferred solution, the torsion spring comprises a main body 420 and a first 422 and a second force arms 421 extending from the main body 420, the main body 420 is sleeved on the first rotation axis 41, the first force arm 422 abuts against the support leg 2, and the second force arm 421 abuts against the reinforcing rib 4.

In this embodiment, the stop block 43 is provided with a first through hole 431. The torsion spring comprises a main body 420 and a first force arm 422 and a second force arm 421 extending from the main body 420. The first force arm 422 passes through or abuts against the first through hole 431 to be limited. The reinforcing rib 4 is provided with a second through hole, and the second force arm 421 passes through or abuts against the second through hole; the second force arm 421 is limited on the reinforcing rib 4; when the free end of the support leg 2 is adapted to fit with the locking assembly 3, the first force arm 422 and the second force arm 421 are twisted, thereby generating a torsional force. The torsional force causes the support leg 2 to rotate and fully unfold when the locking assembly 3 releases constraint on the free end of the support leg 2.

An equivalent solution easily comes to mind is that the first through hole 431 is directly arranged on the support leg 2, or no through hole is provided, and the first force arm 422 directly abuts against the stop block 43, or the through hole is modified into a groove structure. Such solutions shall be regarded as equivalent to providing the first through hole 431 on the stop block 43 to abut against the first force arm 422.

In this embodiment, the reinforcing ribs 4 are arranged corresponding to the support legs 2, and each support leg 2 is provided with a corresponding reinforcing rib 4.

In this embodiment, the connecting seat 5 is sleeved on the center column 1, and when the support legs 2 are folded or unfolded, the connecting seat 5 can slide relative to the center column 1.

Referring to FIGS. 7-11, the locking assembly 3 comprises a fixing seat 32, a trigger button 31 and a second elastic member 34; the fixing seat 32 is connected with the center column 1, and the second elastic member 34 is arranged between the trigger button 31 and the fixing seat 32; in addition, one end of the trigger button 31 is provided with a clamping structure; when the support legs 2 are folded, the clamping structure is used to limit the movement of the support legs 2 relative to the center column 1, that is, to limit the unfolding of support legs 2; when the trigger button 31 is pressed, the clamping structure moves to release constraint on the support legs 2.

In this embodiment, the clamping structure is driven to move by pressing, which releases constraint and avoids forcibly separating the support legs 2 from the center column 1 with a large force; the structural design is ingenious. In which, the fixing seat 32 can be an integral structure with the center column 1, or two independent structures, which are connected together by bonding, bolts and other means; the second elastic member 34 can be a spring or a leaf spring.

In this embodiment, one end of the fixing seat 32 is connected with the center column 1, and the other end thereof is provided with a second groove, one end of the second elastic member 34 is accommodated in the second groove and abuts against a bottom of the second groove, and the other end thereof is sleeved on the trigger button 31 or abuts against the trigger button 31. It should be noted that when the trigger button 31 is pressed, the second elastic member 34 is compressed, and the trigger button 31 is displaced to drive the clamping structure to move; after the trigger button 31 is released, under action of the second elastic member 34, the trigger button 31 drives the clamping structure to return to an initial position for secondary pressing or impacting.

In this embodiment, in addition to pressing, the support stand can also be thrown directly to the ground so that the ground hits the trigger button 31. After the trigger button 31 is pressed by the ground, the second elastic member 34 is compressed and the constraint on the free end of the support leg is released; then under action of the torsion spring, the support legs automatically bounce off and fully unfold; the whole process is very convenient.

In addition, in this embodiment, in order to better restrict the second elastic member 34 to be compressed only in an axial direction, a limit cover 33 is further provided; the limit cover 33 is arranged above the groove of the fixing seat 32 and forms an accommodating space with the groove of the fixing seat 32; the second elastic member 34 is located in the accommodating space; the cross section of the accommodating space is slightly larger than that of the second elastic member 34, so as to ensure that the second elastic member 34 can only be compressed or stretched along its own axial direction; a preferred second elastic member 34 is a spring. In this embodiment, the limit cover 33 is provided with an opening, and one end of the trigger button 31 not sleeved with the second elastic member 34 extends out from the opening; the trigger button 31 can extend into an accommodating space.

A top of one end of the trigger button 31 not sleeved with the second elastic member 34 is provided with a pressing cap, so as to facilitate pressing.

In this embodiment, one end of the trigger button 31 that is sleeved with the second elastic member 34 is provided with an extension portion 313, the extension portion 313 surrounds an axial direction of the trigger button 31, and a clamping structure is arranged on the extension portion 313; when the trigger button 31 compresses the second elastic member 34, it drives a clamping structure to move in a direction of compressing the second elastic member 34; after the clamping structure moves, the constraint on the support legs 2 is released.

In which, the clamping structure is a first bulge 312, the support leg 2 is provided with a second bulge 21, and the first bulge 312 and the second bulge 21 abut against each other to limit the movement of the support leg 2 relative to the center column 1; when the trigger button 31 is pressed, the first bulge 312 moves downward and separates itself from the second bulge 21 to release constraint on the support leg 2; when the trigger button 31 is released, under a restoring force of the second elastic member 34, the first bulge 312 moves upward and returns to its original locking position. In this embodiment, when the first bulge 312 is in the locking position, it passes through the limit cover 33 and abuts against the second bulge 21.

In this embodiment, when it is necessary to fold the support legs 2, the support legs 2 can be directly manually rotated to approach the center column 1; during a folding process, the second bulge 21 on the support leg 2 moves along an inclined surface of the first bulge 312 and presses down the first bulge 312; after the support legs 2 are fully folded, the first bulge 312 pops up again, returns to the locking position, abuts against the second bulge 21 to limit unfolding of the support legs 2.

Figure 12:
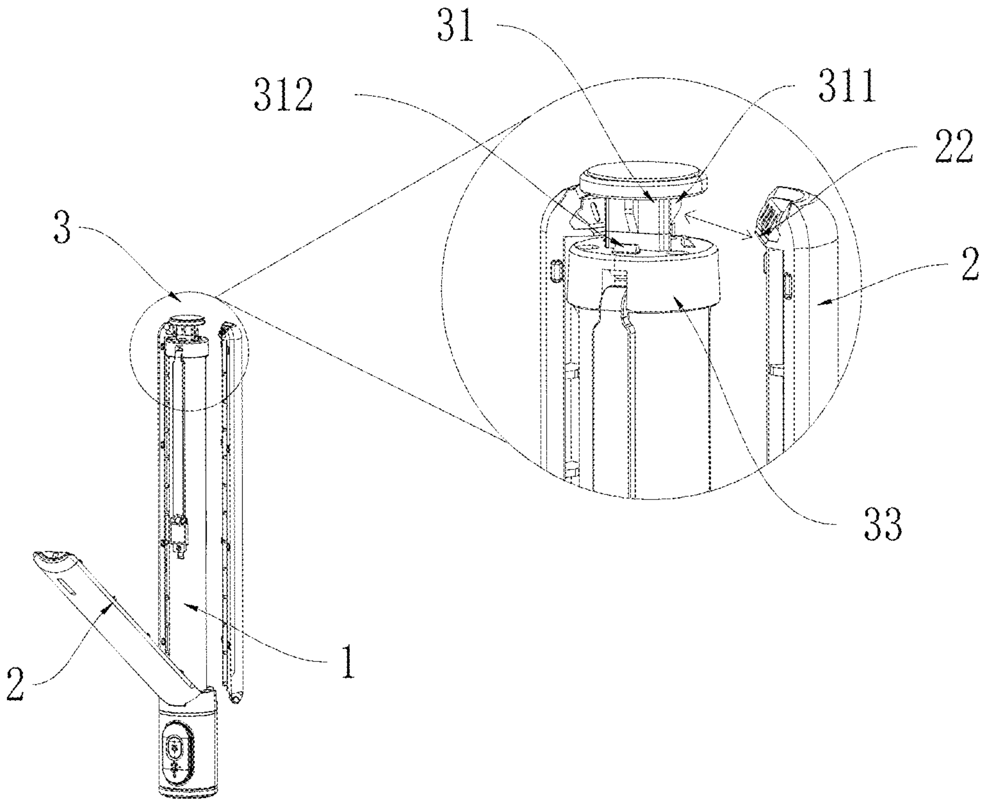
FIG. 12 is a structural view of an extrusion block according to the present disclosure.

Referring to FIG. 12, in this embodiment, an extrusion block 311 is provided on a side surface of one end of the trigger button 31 not sleeved with the second elastic member 34 so as to assist in fully unfolding the support legs 2; when the trigger button 31 is pressed, the clamping structure releases constraint on the support leg 2, and at the same time, the extrusion block 311 moves along with the trigger button 31 to press the support legs 2 so that the support legs 2 move in an unfolding direction to help fully unfolding the support legs 2.

In this embodiment, the extrusion block 311 protrudes from a side of the trigger button 31 and has an inclined surface structure; the inclined surface is configured to guide the support leg 2 to move along the inclined surface when the extrusion block 311 moves; when the extrusion block 311 contacts with the support leg 2 and presses the support leg 2 away from its original position, a contact point between the support leg 2 and the extrusion block 311 is an extrusion point; when the trigger button 31 is not pressed, the extrusion block 311 does not contact with the extrusion point; after the trigger button 31 is pressed, the extrusion point moves relative to the inclined surface of the extrusion block 311, and the support leg 2 gradually leaves the original locking position until the extrusion point cannot press the support leg 2.

In this embodiment, the center column 1 is provided with a connecting seat 5; one end of the support leg 2 is rotatably connected to the connecting seat 5, and the other end thereof is a free end; when the free end of the support leg 2 is adapted to fit with the locking assembly 3, the support leg 2 is in a folded state; when the free end of the support leg 2 is not adapted to fit with the locking assembly 3, the support leg 2 is in an unfolded or unfoldable state.

In this embodiment, one end of the reinforcing rib is rotatably connected with the support leg 2, and the other end thereof is rotatably connected with the fixing seat 32 or directly rotatably connected with the center column 1; the reinforcing ribs can greatly improve the stability of the support legs 2.

The above are only preferred embodiments of the present disclosure, and do not limit the patent scope of the present disclosure. Under the inventive concept of the present disclosure, any equivalent structure transformation made by using the contents of the description and drawings of the present disclosure or directly or indirectly applied to other related technical fields shall be included in the patent protection scope of the present disclosure.

The invention claimed is:

1. A support leg stand with unfoldable/foldable support legs capable of fully bouncing off, comprising:

a center column, the center column being provided with a connecting seat;

the unfoldable/foldable support legs; one end of the support leg is rotatably connected with the connecting seat, and the other end thereof is a free end; when the free end of the support leg is close to the center column, the support leg is folded, and when the free end of the support leg is away from the center column, the support leg is unfolded;

a locking assembly, wherein the locking assembly is adapted to fit with the free end of the support leg when the support leg is folded, so as to limit the movement of the support leg relative to the center column, and the locking assembly will release constraint after being triggered; and reinforcing ribs; wherein one end of the reinforcing rib is rotatably connected with the support leg, and the other end thereof is rotatably connected with the center column or the locking assembly; in addition, a first elastic member is arranged between the reinforcing rib and the support leg; when the free end of the support leg is adapted to fit with the locking assembly, the first elastic member undergoes elastic deformation;

when the locking assembly releases constraint, the free end of the support leg moves away from the center column under action of a restoring force generated by the first elastic member and the support legs fully unfold.

2. The support leg stand with unfoldable/foldable support legs capable of fully bouncing off according to claim 1, wherein the reinforcing rib is provided with a first rotation axis, the first rotation axis is rotatably connected with the support leg; and the first elastic member is a torsion spring sleeved on the first rotation axis; and when the free end of the support leg is adapted to fit with the locking assembly, the torsion spring is twisted and generates a torsional force; when the locking assembly releases constraint, the torsion spring drives the free end of the support leg away from the center column and the support legs then fully unfold.

3. The support leg stand with unfoldable/foldable support legs capable of fully bouncing off according to claim 2, wherein at least two first grooves are formed on the support leg, and both ends of the first rotation axis are respectively inserted into the first grooves to form a structure in which the first rotation axis rotates in the first groove.

4. The support leg stand with unfoldable/foldable support legs capable of fully bouncing off according to claim 3, wherein the support leg is further provided with a stop block, the stop block is arranged at an opening of the first groove and configured to prevent the first rotation axis from sliding out of the first groove.

5. The support leg stand with unfoldable/foldable support legs capable of fully bouncing off according to claim 2, wherein a stop block is arranged on the support leg, at least two first grooves are formed on the stop block, and both ends of the first rotation axis are respectively inserted into the first grooves to form a structure in which the first rotation axis rotates in the first groove.

6. The support leg stand with unfoldable/foldable support legs capable of fully bouncing off according to claim 2, wherein the torsion spring comprises a main body and a first force arm and a second force arm extending from the main body, the main body is sleeved on the first rotation axis, the first force arm abuts against the support leg, and the second force arm abuts against the reinforcing rib.

7. The support leg stand with unfoldable/foldable support legs capable of fully bouncing off according to claim 6, wherein a first through hole is formed on the support leg, the first force arm passes through or abuts against the first through hole, a second through hole is formed on the reinforcing rib, and the second force arm passes through or abuts against the second through hole.

8. The support leg stand with unfoldable/foldable support legs capable of fully bouncing off according to claim 6, wherein a stop block is arranged on the support leg, a first through hole is formed on the stop block, the first force arm passes through or abuts against the first through hole, a second through hole is formed on the reinforcing rib, and the second force arm passes through or abuts against the second through hole.

9. The support leg stand with unfoldable/foldable support legs capable of fully bouncing off according to claim 1, wherein the reinforcing ribs are arranged in one-to-one correspondence with the support legs.

10. The support leg stand with unfoldable/foldable support legs capable of fully bouncing off according to claim 1, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

11. The support leg stand with unfoldable/foldable support legs capable of fully bouncing off according to claim 10, wherein the fixing seat is provided with a second groove, one end of the second elastic member is accommodated in the second groove and abuts against a bottom of the second groove, and the other end of the second elastic member is sleeved on the trigger button.

12. The support leg stand with unfoldable/foldable support legs capable of fully bouncing off according to claim 10, wherein an extrusion block is arranged on a side of one end of the trigger button not sleeved with the second elastic member, and when the trigger button is stimulated, the clamping structure releases constraint on the support legs; at the same time, the extrusion block moves along with the trigger button to extrude the support legs so that the support legs move in an unfolding direction.

13. The support leg stand with unfoldable/foldable support legs capable of fully bouncing off according to claim 2, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

14. The support leg stand with unfoldable/foldable support legs capable of fully bouncing off according to claim 3, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

15. The support leg stand with unfoldable/foldable support legs capable of fully bouncing off according to claim 4, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

16. The support leg stand with unfoldable/foldable support legs capable of fully bouncing off according to claim 5, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

17. The support leg stand with unfoldable/foldable support legs capable of fully bouncing off according to claim 6, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

18. The support leg stand with unfoldable/foldable support legs capable of fully bouncing off according to claim 7, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

19. The support leg stand with unfoldable/foldable support legs capable of fully bouncing off according to claim 8, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

20. The support leg stand with unfoldable/foldable support legs capable of fully bouncing off according to claim 9, wherein the locking assembly comprises a fixing seat, a trigger button and a second elastic member, the fixing seat is connected with the center column, and the second elastic member is arranged between the trigger button and the fixing seat; and in addition, one end of the trigger button is provided with a clamping structure; when the support legs are folded, the clamping structure is configured to restrict the free end of the support leg from moving relative to the center column; when the trigger button is stimulated, the clamping structure moves and releases constraint on the free ends of the support legs.

* * * * *